Figure 1:
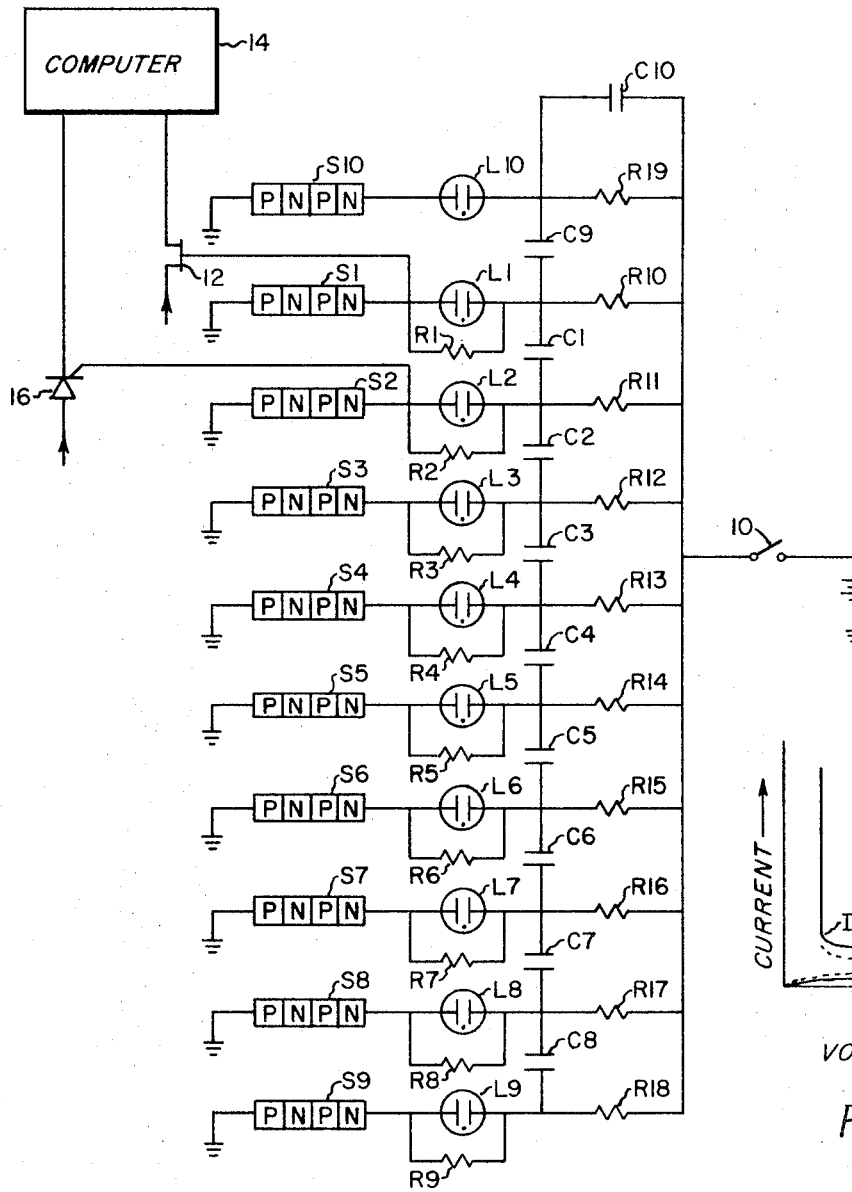

United States Patent

[11] 3,584,962

| [72] | Inventors | Edgar L. Irwin<br>Glen Burnie;<br>Pieter De Wit, Baltimore, both of, Md. |
|---|---|---|
| [21] | Appl. No. | 867,211 |
| [22] | Filed | Oct. 17, 1969 |
| [45] | Patented | June 15, 1971 |
| [73] | Assignee | Westinghouse Electric Corporation<br>Pittsburgh, Pa. |

[54] DIGITAL LIGHT METER COMPRISING PLURAL LIGHT ACTIVATED DEVICES BIASED TO BECOME CONDUCTING AT DIFFERENT ILLUMINATION LEVELS
7 Claims, 1 Drawing Fig.

[52] U.S. Cl. .................................................. 356/222,
250/208, 250/211, 315/154, 315/155, 356/226,
356/227
[51] Int. Cl. ............................................ G01j 1/42,
G01j 1/44, H01j 39/12
[50] Field of Search............................................ 356/227,
222, 224; 315/154, 149, 155, 156; 307/311;
250/211 (J), 206, 208, 226

[56] References Cited
UNITED STATES PATENTS

| 3,062,961 | 11/1962 | Kalns et al. ................... | 250/206 |
|---|---|---|---|
| 3,309,610 | 3/1967 | Yamamoto.................. | 307/311 |
| 3,354,312 | 11/1967 | Howell ......................... | 250/206 |

Primary Examiner—James W. Lawrence
Assistant Examiner—T. N. Grigsby
Attorneys—F. H. Henson and E. P. Klipfel

ABSTRACT: Described is a digital light meter formed from devices, such as silicon four-layer switches, each of which can be triggered into conduction by incident photons. The intensity of the photons necessary to trigger a switch into conduction is dependent upon the magnitude of a bias voltage applied across the device. By providing a plurality of switches, all exposed to the same source of incident light, and by biasing the respective switches with progressively decreasing bias voltages, the number of switches triggered into conduction will increase as the light intensity increases. The invention additionally includes means for automatically terminating the flow of current through each switch when the intensity of the incident photons falls below the triggering level for that switch.

INVENTORS.
EDGAR L. IRWIN
BY PIETER de WIT

Ernest P. Klipfel
ATTORNEY

DIGITAL LIGHT METER COMPRISING PLURAL LIGHT ACTIVATED DEVICES BIASED TO BECOME CONDUCTING AT DIFFERENT ILLUMINATION LEVELS

BACKGROUND OF THE INVENTION

As is known, existing techniques used to determine the intensity of incident photon flux upon a surface generally utilizes a thin film whose resistivity varies as a function of the number of photons incident. The output of such a device, therefore, is an analog signal; and if it is desired to feed information concerning the intensity of a light source into a digital computer or the like, an analog-to-digital converter is necessary. Furthermore, thin film devices have an output that varies linearly with intensity over a very narrow range. Consequently, when conversion of the analog-to-digital form is required, the nonlinearity of thin film response becomes a serious problem.

SUMMARY OF THE INVENTION

As an overall object, the present invention seeks to provide a new and improved light meter wherein the intensity of light is indicated directly by a number of digital ON or OFF signals rather than by an analog signal.

Another object of the invention is to provide a light meter of the type described employing, as light sensing elements, silicon four-layer switches.

Still another object of the invention is to provide a digital light meter having a large dynamic range on the order of at least 100,000 to 1.

In accordance with the invention, a digital light meter is provided comprising a plurality of devices of the type which will normally act as open circuits but which can be triggered into conduction by incident photons. These devices are preferably silicon four-layer switches which may be of the PNPN or NPNP-type type. The intensity of the photons necessary to trigger each four-layer switch is a function of a bias voltage applied across two terminals of the device. Consequently, by applying bias voltages of different magnitudes across the respective switches and by exposing all switches to the same source of light, each device will be triggered into conduction at a different photon intensity level. By counting the number of switches which are triggered into conduction, a digital indication of the light intensity is readily obtained.

Further, in accordance with the invention, a single source of bias voltage is provided for all of the four-layer silicon switches, the bias across the respective switches being varied by means of dropping resistors of progressively increasing resistance values. These dropping resistors are connected to the four-layer switches such that whenever the light intensity falls below the level at which a switch is activated or closed, the switch will again be rendered nonconducting or open.

Figure 2:
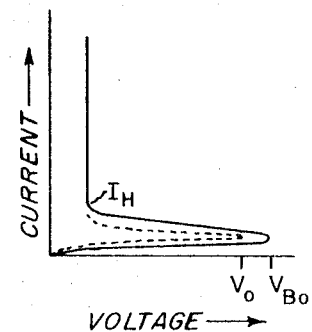

The above and other objects and features of the invention will become apparent from the following detailed description taken in connection with the accompanying drawings which form a part of this specification, and in which:

FIG. 1 is a schematic circuit diagram of one embodiment of the invention employing neon lamps; and FIG. 2 is a plot showing the voltage-current characteristics of the four-layer silicon switches used in the invention.

With reference now to the drawings, and particularly to FIG. 1, 10 silicon four-layer PNPN switches are shown and identified by the numerals S1 through S10. As is known, a silicon four-layer switch exhibits two metastable states. In the first state, the device acts as an open circuit until the voltage applied across the device exceeds a breakdown limit, whereupon the device resembles a short circuit characterized by a very low impedance. Upon interruption of the flow of current through the device, it reverts to the open state. Otherwise, the device continues to conduct. In this respect, the silicon four-layer switch is somewhat similar to a thyratron or a silicon controlled rectifier, except that it has no control or gate electrode.

The voltage-current characteristics of the switches S1—S10 are shown in FIG. 2. Until the bias voltage across the device reaches the value, $V_{BO}$, a small leakage current flows through the switch. When the voltage $V_{BO}$ is reached, a negative-resistance region occurs which terminates at $I_{tt}$, where all three PN junctions are forward biased. At this point, the device acts as a closed switch with current increasing essentially independently of voltage.

If the surface of a PNPN switch is flooded with photons, the curve can be caused to shift to the left as shown by the broken line in FIG. 2. Assuming that a bias voltage $V_0$, beneath the normal breakdown voltage is applied across the device, the incident photons will cause the device to fire when the curve is shifted to the left in an amount where the breakdown voltage is then equal to $V_0$. In this manner, it can be seen that the intensity of photons necessary to cause the device to fire will be a function of the magnitude of the bias voltage $V_0$ applied across the device. As the bias voltage approaches the breakdown value $V_{BO}$, smaller and smaller amounts of incident light energy are required to trigger the device into conduction.

As shown in FIG. 1, the end P-type layer of each switch S1 through S10 is grounded; while the end N-type layer is connected to one end of an associated neon bulb L1—L10. Bulbs L1 through L9 are shunted by resistors R1—R9 as shown. The other sides of the neon bulbs L1—L10 are connected through resistors R10—R19 and power switch 10 to the positive terminal of a source of potential, such as battery B1, the negative terminal of the battery being grounded. Connected between the low potential sides of the resistors R10 and R11 is a capacitor C1. Similarly, capacitor C2 is connected between the low potential sides of resistors R11 and R12; capacitor C13 is connected between the low potential sides of resistors R12 and R13; and so on. As shown, there are nine such resistors identified as R1 through R9, resistor R9 being connected between the low potential sides of resistors R19 and R10. Finally, capacitor C10 is connected in shunt with resistor R19.

When the switch 10 is closed, a bias is applied across the four-layer switch S1, for example, through resistor R10 and neon lamp L1 in shunt with resistor R1. Assuming that the potential across the switch S1 is below its breakdown potential, no current flows and the bias potential appears across the switch S1. Furthermore, the potential across resistor R1 is insufficient to initiate conduction in the neon lamp L1. However, when photons of sufficient intensity flood the switch S1, its breakdown voltage is reduced and it assumes its short circuit status. The voltage across resistor R1 now increases to the point where the lamp L1 is ignited. The value of resistor R1 is on the order of about one-tenth the value of resistor R10. For example, resistor R10 may have a value of 1 megohm while the value of resistor R1 is 100,000 ohms. When the switch S1 fires, current through the switch and resistor R10 increases abruptly, thereby producing a current spike. The capacitors C1 through C10 act to suppress this spike and prevent it from triggering the other switches. The value of resistor R10 establishes the initial bias voltage across the switch S1 and also limits the current through the switch. That is, the value of resistor R10 is sufficiently high that insufficient current can flow through the switch to maintain conduction. Thus, the switch S1 cuts off.

Resistor R10 and capacitor C1 form the RC components of a relaxation oscillator, causing a pulsating direct current to appear across the switch S1. That is, with the switch S1 in the open state, the voltage across resistor R10 is relatively low. However, when the switch S1 fires, the voltage across the resistor R10 increases abruptly, thereby tending to cut off the switch S1. When the voltage across resistor R10 goes to zero by virtue of a reduction in current flow, the switch S1 again opens. Assuming, however, that switch S1 is still flooded with photons of the same intensity, it will again fire. Thus, as long as the switch S1 is flooded with photons of sufficient intensity, a pulsating current flows through the circuit to maintain the lamp L1 energized. On the other hand, whenever the incident photons fall below the requisite firing level, the switch S1 will remain open when the voltage across resistor R10 goes to zero.

The same description can be applied to each switch, indicator combination in the array. However, the values of resistors R10 through R19 are varied such that the switches S1 through S10 will be triggered into conduction at different photon intensity levels. That is, resistor R10 may have the lowest resistance value and, therefore, the bias voltage across switch S1 will be higher than that across the remaining switches and a higher photon intensity will be required to fire the remaining switches S2 through S10. The neon lamp L10 in series with switch S10 has no resistor in shunt with it and, therefore, determines the maximum sensitivity.

If desired, the junction of switch S1 and lamp L1, for example, can be connected to the gate electrode of a field effect transistor 12 which, in turn, applies an ON or OFF digital signal to a digital computer 14. Similarly, a silicon controlled rectifier 16 having its gate electrode connected to the junction of switch S2 and lamp L2 can be used for the same purpose. In this manner, the intensity of the light incident upon switches S1 through S10 will be automatically recorded in the computer 14 and used to control other apparatus, for example. In this latter case, the neon lamps L1 through L10 can be eliminated unless it is desired also to obtain a visual indication of light intensity. With the apparatus shown in FIG. 1, light intensity will be a function of the number of lamps which are energized, as will be understood.

The proper selection of resistor steps in the circuit of FIG. 1 can produce a dynamic range of at least 100,000 to 1. Furthermore, selection of special switches can extend this range even further. Conveniently, the output of the system is already digitized for ease of application.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a light meter, the combination of a plurality of two-terminal devices of the type which normally act as open circuits but which can be triggered into conduction by incident photons, the intensity of the photons necessary to trigger each device being a function of a bias voltage applied across the two terminals of the device, and means for applying bias voltages of different magnitudes across the respective devices in the plurality of devices such that the respective devices will be triggered into conduction at different photon intensity levels.

2. The combination of claim 1 wherein said devices comprise four-layer semiconductor switches.

3. The combination of claim 1 wherein said devices comprise silicon four-layer PNPN switches.

4. The combination of claim 1 wherein said devices comprise silicon four-layer NPNP switches.

5. The combination of claim 1 wherein the means for applying bias voltages across the respective devices comprises a single source of direct current potential, and resistors of different magnitudes connecting said source of bias potential to the respective devices.

6. The combination of claim 1 wherein each of said resistors is connected in series with an associated one of said devices and a neon lamp.

7. The combination of claim 6 wherein said resistors are interconnected by means of capacitors, each capacitor forming the capacitive component of a relaxation oscillator with its associated resistor.